United States Patent [19]

Bühler et al.

[11] Patent Number: 4,656,148

[45] Date of Patent: Apr. 7, 1987

[54] METHOD FOR THE REACTIVATION OF A CATALYST USED FOR REMOVAL OF NITROGEN OXIDES

[75] Inventors: Hans-Eugen Bühler, Königstein; Hermann Stein, Taunusstein; Blagoje Levkov; Hartmut Kainer, both of Wiesbaden; Horst Kalfa, Idstein; Daniel Grimm, Schlangenbad-Bärstadt, all of Fed. Rep. of Germany

[73] Assignee: Didier-Werke AG, Weisbaden, Fed. Rep. of Germany

[21] Appl. No.: 768,417

[22] Filed: Aug. 22, 1985

[30] Foreign Application Priority Data

Aug. 22, 1984 [DE] Fed. Rep. of Germany ....... 3430887

[51] Int. Cl.$^4$ .......... B01J 38/04; B01J 23/94; B01D 53/36; C01B 21/00
[52] U.S. Cl. .......................... 502/34; 55/74; 55/387; 422/110; 423/239; 502/6; 502/515
[58] Field of Search .................. 502/34, 53, 515, 517, 502/6; 423/239 R, 239 A; 55/74

[56] References Cited

U.S. PATENT DOCUMENTS

| 3,072,457 | 1/1963 | Bloch | 502/34 |
| 3,791,103 | 2/1974 | Kusamo et al. | 55/74 |
| 3,909,204 | 9/1975 | Allen | 23/254 E |
| 3,967,933 | 7/1976 | Etess et al. | 422/52 |
| 4,043,939 | 8/1977 | Kasaoka | 252/416 |
| 4,044,102 | 8/1977 | Muraki et al. | 423/239 |
| 4,049,777 | 9/1977 | Divivier et al. | 423/239 |
| 4,165,233 | 8/1979 | Gagneraud | 75/24 |
| 4,235,604 | 11/1980 | Wagener et al. | 48/197 R |
| 4,259,312 | 3/1981 | Flockenhaus et al. | 423/659 |
| 4,323,544 | 4/1982 | Magder | 502/517 |
| 4,398,948 | 8/1983 | Emoto et al. | 75/60 |
| 4,448,895 | 5/1984 | Ono et al. | 502/304 |
| 4,503,162 | 3/1985 | Windawi et al. | 502/174 |

FOREIGN PATENT DOCUMENTS

| 2402094 | 6/1980 | Fed. Rep. of Germany . | |
| 62246 | 2/1975 | Japan | 423/239 A |
| 5094 | 1/1978 | Japan | 502/517 |
| 15824 | 1/1982 | Japan | 423/239 |

Primary Examiner—P. E. Konopka
Attorney, Agent, or Firm—Nils H. Ljungman

[57] ABSTRACT

In a process for the reactivation of a catalyst, which is used for the removal of $NO_x$, oxides of nitrogen, from exhaust gases, the catalyst should be capable of easy reactivation. For this purpose, when the catalyst starts to lose its activity, it is exposed in a reducing atmosphere to a carbon monoxide current. In an apparatus for the execution of the process, the catalyst is placed in two separate chambers. The carbon monoxide stream is directed alternately to both chambers.

16 Claims, 1 Drawing Figure

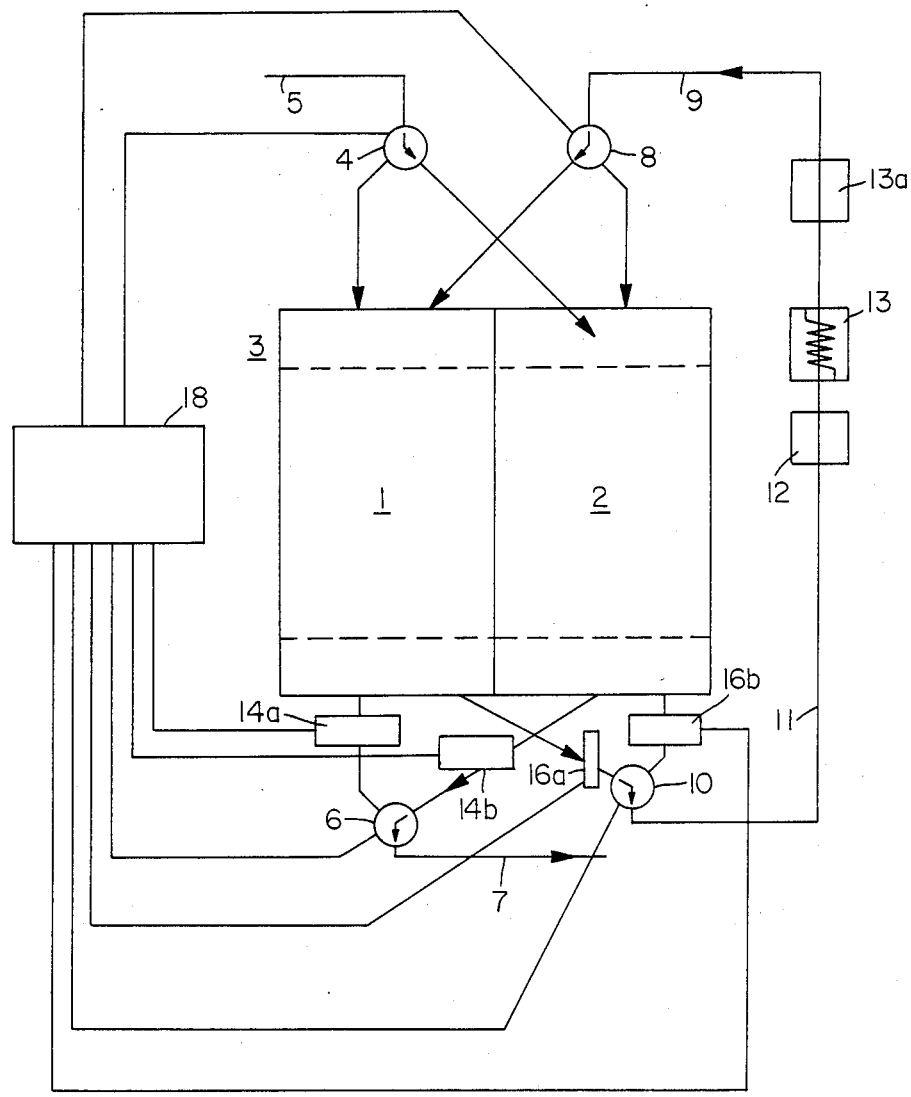

METHOD FOR THE REACTIVATION OF A CATALYST USED FOR REMOVAL OF NITROGEN OXIDES

CROSS-REFERENCE TO CO-PENDING APPLICATIONS

Co-pending application Ser. No. 768,418 for filing on Aug. 22, 1985, entitled "Process For Cleaning An Exhaust Gas", and co-pending application Ser. No. 768,508 for filing on Aug. 22, 1985, entitled "Catalyst For Removal Of Nitrogen Oxides From Exhaust Gases", are both assigned to the same assignee as the instant application.

BACKGROUND OF THE INVENTION

1. Field of the Invention

The invention relates to a process for the reactivation of a catalyst, and more particularly, to a catalyst which is used for the removal of $NO_x$ from exhaust gases such as smoke. The invention also relates to an apparatus for the execution of the process taught by the invention.

2. Description of the Prior Art

Catalysts, which are used for the removal of $NO_x$ from exhaust gases, especially exhaust gases such as smoke containing dusts, lose their activity during use.

It was found that the activity of catalysts for the removal of $NO_x$ depends on the presence of compounds of the transition elements in their lowest stable oxidation phase. During operation, the transition element compounds are converted to higher oxidation phases. This is the reason for the reduction of the activity of the catalyst.

Another reason for the reduction of the activity of the catalyst is that dust is deposited in the pores of the catalyst, so that the catalyst is plugged up.

Some examples of catalytic technology are found in U.S. Pat. No. 4,259,312, entitled "Process And Apparatus For Catalytically Reacting A Reducing Gas And Water Vapor"; U.S. Pat. No. 4,235,604, entitled "Method For Processing Coke Oven Gas"; and U.S. Pat. No. 4,049,777, entitled "Method Of Waste Gas Treatment", all of which are assigned to a corporation associated with the assignee of the instant application.

Further examples of catalytic technology are found in U.S. Pat. No. 4,448,895, entitled "Process For Preparation Of Catalyst For Cleaning Exhaust Gases And Catalysts Prepared For The Process", and U.S. Pat. No. 4,503,162, entitled "Catalyst Systems For The Conversion Of Gases".

Examples of reactivation of catalysts useful in nitrogen oxide removal are described in U.S. Pat. No. 4,044,102, entitled "Method For Treating Exhaust Gases", and U.S. Pat. No. 4,043,939, entitled "Reactivation Of Catalysts Useful For Nitrogen Oxide Removal." All of the above-cited patents are incorporated herein by reference.

OBJECTS OF THE INVENTION

The object of the invention is to describe a process by means of which the catalyst can be reactivated.

Another object of the invention is to provide an apparatus for the execution of such a process.

SUMMARY OF THE INVENTION

The object of the invention is achieved in that the catalyst, when it begins to lose its activity, is exposed in a reducing atmosphere to a heated carbon monoxide (CO) current. The carbon monoxide thereby gets into the pores of the catalyst. There the carbon monoxide breaks down into carbon dioxide and separated carbon. This causes the outermost catalyst zones to break off, so that, after these inactive zones break off, active catalyst zones are again exposed. The reducing atmosphere leads to a reduction of the transition elements into the oxidation phases active for oxides of nitrogen ($NO_x$) reduction.

Preferably, a raw material, semi-finished product or waste product from steel production is used for the catalyst. Such a catalyst can be effectively reactivated by means of the above-mentioned process. Such a process also has the advantage that the primary material is economical, and that after use it can be stored or even reprocessed without causing damage to the environment.

The iron oxides of the catalysts are reduced in the process described above, so that active, finely-divided metallic iron catalytically brings about the decomposition of the carbon monoxide in the vicinity of the catalyst pores.

An apparatus for the execution of the process divides the catalyst into two separate chambers, with the carbon monoxide flow directed alternately into the chambers when the activity of the catalyst decreases.

BRIEF DESCRIPTION OF THE DRAWING

The single drawing illustrates an apparatus for the execution of the process taught by the invention.

DESCRIPTION OF THE PREFERRED EMBODIMENTS

A suitable primary material for the catalyst is a naturally-occurring ferrous ore chosen from the group consisting of magnetite, hematite, siderite, chromium ore or iron pyrite. Modifications of these ores can also be used. There should be a total of at least 3% of the transition elements with the lowest stable oxidation stage. The at least 3% of transition element is preferably by weight. The effective total is thereby the percentage sum of $Fe^{2+}$, $Cr^{3+}$, $Ti^{4+}$ and other transition elements. Especially transition elements in the IVB group, Titanium, Zirconium and Hafnium, are applicable to the teachings of the invention. Additional transition elements may be Nickel, Cobalt and Manganese, as well as others well known in the prior art. For example, the ores with their principal compositions indicated in the following table are suitable.

|  | Sydvarange Iron Ore Concentrate % | Urkutsk Manganese Ore Chromium Ore % | Lake Iron Ore Konrad Ore % |
|---|---|---|---|
| Fe | 65.51 | 10.00 | 32.22 |
| $Fe^{2+}$ | 21.50 | unknown | 3.83 |
| Mn | 0.13 | unknown | 0.24 |
| P | 0.01 | unknown | 0.36 |
| $SiO_2$ | 7.73 | 5.00 | 14.52 |
| $Al_2O_3$ | 0.55 | 11.80 | 5.30 |
| CaO | 0.10 | 0.58 | 12.52 |
| MgO | 0.68 | 16.50 | 3.83 |
| $Cr_2O_3$ | — | 49.60 | — |

Intermediate products of pig iron production can also be used for the catalyst. These include sinter and iron ore pellets, which also exhibit an effective total of more than 3% of the transition elements. For example, the following values were determined in a sinter analysis:
Fe=60%, of which $Fe^{2+}$=11.15%, Mn=0.21%, $SiO_2$=6.60%, $Al_2O_3$=2.17%, CaO=4.75%, MgO=1.44%, P=0.08%.

Waste products from steel production can also be used as raw material for the catalyst. For example, the following slags, with essentially the composition indicated in the following table, can also be used:

|  | LDAG Slag % | Bessemer Slag % | LD Slag % |
|---|---|---|---|
| Fe | 23.60 | 14.02 | 23.40 |
| $Fe^{2+}$ | 14.63 | 6.00 | 9.03 |
| Mn | 3.28 | 2.56 | 3.60 |
| $P_2O_5$ | 5.78 | 15.42 | 3.46 |
| CaO | 40.10 | 48.85 | unknown |
| MgO | unknown | 1.14 | unknown |

An example of an LD converter is found in U.S. Pat. No. 4,398,948, entitled "Methods For Controlling Blowing, Controlling The Slag Formation And Predicting Slopping In the Blowing Of Molten Pig Iron In LD Converter". An example of LD slag is found in U.S. Pat. No. 4,165,233, entitled "Treating Molten Metallurgical Slag". Both of the above-cited patents are incorporated herein by reference.

A red mud can also be used to manufacture the catalyst, in the form in which it is obtained, in the production of aluminum. Such a red mud may have the following composition:
$SiO_2$: 11.10%
$Al_2O_3$: 33.50%
$TiO_2$: 14.40%
$Fe_2O_3$: 37.50%
CaO: 1.50%
$ZrO_2$: 0.46%

In addition, a recycling product can also be used as the primary material for the catalyst, if it exhibits a sufficiently effective total of appropriate transition elements.

Referring to the FIGURE, the catalyst is divided into two chambers 1 and 2 of a double-chamber reactor 3. By means of a reversing or switching valve 4, an exhaust gas feed line 5 can be alternately connected with each of the chambers 1 and 2. Accordingly, both chambers 1 and 2 are connected by means of a reversing or switching valve 6 with an exhaust gas exhaust line 7.

A carbon monoxide line 9 is connected to the two chambers 1 and 2 by means of a second reversing or switching valve 8. By means of a third reversing or switching valve 10, the two chambers 1 and 2 are connected with a discharge line 11. The carbon monoxide reversing or switching valves 8 and 10 additionally have a completely turned off position, where nothing will be passed therethrough. The discharge line 11 is connected to the carbon monoxide line 9 by means of a $CO_2$-washer 12 and a heating appparatus 13. The reversing or switching valves 4, 6, 8 and 10 can be connected so that either chamber 1 or 2 can be connected to the feed line 5 and exhaust line 7, and the other chamber 2 or 1 to the carbon monoxide line 9 and discharge line 11. A pump 13a is shown connected in the carbon monoxide line 9 for pumping the carbon monoxide gas into a selected one of the chambers 1 and 2. The pump 13a could alternatively be connected in the discharge line 11 and is either manually or automatically activated as required.

In the embodiment, exhaust gas containing $NO_x$, $O_2$ and dust is conducted to the chamber 2. The catalyst in the chamber 2 removes $NO_x$ from the exhaust gas, so that exhaust gas with a reduced level of $NO_x$ leaves the exhaust line 7.

In the embodiment, the chamber 1 is fed carbon monoxide heated by the heater 13 to approximately 500° C. by means of the carbon monoxide line 9. This carbon monoxide reactivates the catalyst in chamber 1. Inactive catalyst zones are thereby split off in the reducing atmosphere of chamber 1. It has been shown that for a reactivation of the catalyst, a reaction time of 4 to 8 hours is sufficient. This time is a function of the structure and the composition of the catalyst in question. Carbon dioxide is formed during the reactivation, and together with the remaining carbon monoxide, the carbon dioxide is discharged by means of the discharge line 11 in the circuit. The carbon dioxide is washed in the washer 12. The carbon monoxide is again heated to 500° C., and again fed into chamber 1. In order to produce a reducing atmosphere in the chambers 1 and 2, an auxiliary heater (not shown) may be required.

When the catalyst in chamber 1 has been reactivated, it is placed in a holding status by turning off the carbon monoxide flow by turning off the reversing or switching valve 8. After a deactivation of the catalyst in chamber 2, the feed line 5 and exhaust line 7 are switched to the chamber 1, and the chamber 2 is connected with the carbon monoxide line 9 and the discharge line 11. The nitrogen is now removed from the exhaust gas in chamber 1, and the catalyst in chamber 2 is reactivated.

Preferably, the exhaust line from chamber 1 to the reversing or switching valve 6 has an oxides of nitrogen sensor 14a connected therein, for sensing and to determine when a predetermined level of oxides of nitrogen has been reached. When the oxides of nitrogen have reached a predetermined level, the reversing or switching valves 4 and 6 switch the flow of exhaust gases from chamber 1 to chamber 2, which has been reactivated by the flow of carbon monoxide therethrough, and is preferably waiting to be used. Examples of $NO_x$, oxides of nitrogen, sensors are described in U.S. Pat. Nos. 3,967,933, entitled "Dual Channel Nitrogen Oxide Analyzer" and 3,909,204, entitled "Gas Pollution Monitor", which are incorporated herein by reference. The sensor 14a is preferably connected to control equipment 18. The control equipment 18 is connected to control the reversing valves 4, 6, 8 and 10, such that in the present switching operation, the exhaust gases are routed from chamber 1 to chamber 2 by the action of the reversing or switching valves 4 and 6. The control equipment 18 next turns on the reversing or switching valves 8 and 10 to permit the flow of carbon monoxide gas to pass through the chamber 1 and, thereby, to reactivate the catalyst therein. A carbon monoxide sensor 16a is provided between the chamber 1 and the reversing or switching valve 10 in the line connected therebetween. When the exhaust carbon dioxide from the chamber 1 has reached predetermined composition, indicating that the catalyst in chamber 1 has been reactivated, a signal from the sensor 16a indicates that the chamber 1 should be reactivated. The control equipment 18 connected to the sensor 16a switches the reversing or switching valves 8 and 10 off so that no further carbon monoxide flows through the chamber 1. The chamber 1 is held in readiness until a sensor 14b transmits a signal to the control equipment 18, which signal indicates that the catalyst in chamber 2 has lost its activity to a predetermined extent, and that it is time to switch the flow of exhaust gas from the chamber 2 to the chamber 1 and repeat the process in the chamber 2 which has taken place in the chamber 1 for the reactivation of the catalyst therein. The sensor 14b, connected in an analogous fashion to sensor 14a, is located between the chamber 2 and the reversing valve 6. A similar sensor 16b is connected to the output of the chamber 2 which has the carbon monoxide gas from the chamber 2 flowing therethrough. All the sensors 14a, 14b, 16a and 16b are connected to the control equipment 18 in an appropriate fashion. The control equipment 18 preferably has circuitry therein which compares the signals from the sensors 14a, 14b, 16a and 16b to predetermined levels stored in the control equipment 18 and switches the equipment, that is, the reversing or switching valves 4, 6, 8 and 10, to appropriate locations to carry out the process. The reversing or switching valves 8 and 10 have a third position, in which no carbon monoxide gas is allowed to pass therethrough. This closed position is used after the reactivation of the catalyst in one of the appropriate chambers and is held until reactivation of one of the chambers by the carbon monoxide gas is required, wherein the reversing or switching valves 8 and 10 are switched into one of their two open positions to allow the passage of carbon monoxide gas through a selected one of the two chambers.

Alternatively, the sensors 16a and 16b may be sensor timers, which indicate when a certain time has elapsed by feeding a signal to the control equipment 18 to stop the flow of carbon monoxide. The signal indicates that carbon monoxide and other gases have flown therethrough for a predetermined time, which time is stored and compared to the signals from the sensors 16a and 16b.

Alternatively, the sensors 14a and 14b may be sensor timers, which indicate when a certain time has elapsed by feeding a signal to the control equipment 18 to stop the flow of exhaust gas. The signal indicates that exhaust gases have flown therethrough for a predetermined time, which time is stored and compared to the signals from the sensors 14a and 14b.

The invention is described hereinabove in the context of the preferred embodiment is not to be taken as limited to all of the provided details thereof, since modifications and variations thereof may be made without departing from the spirit or scope of the invention.

What is claimed is:

1. A method for reactivation of a catalyst which had been at least partially deactivated when used in removal of oxides of nitrogen from an exhaust gas, said catalyst comprising an iron-containing material, said iron-containing material being chosen from a member of the group consisting essentially of magnetite, hematite, siderite, chromium ore, iron pyrite, sinter, iron ore pellets, slag, red mud, Sydvarange iron ore concentrate, manganese ore, Lake iron ore, Konrad ore, and mixtures of the members of this group;
    said method comprising the steps of:
        stopping said flow of exhaust gas across said catalyst which has at least partially lost catalytic activity; and
        flowing heated carbon monoxide gas which has been heated to a temperature of about 500° C. over said at least partially deactivated catalyst;
        whereby at least a part of said carbon monoxide breaks down into carbon dioxide and carbon, thereby causing at least a part of an outermost inactive surface of said catalyst to break off and to expose active catalyst surface.

2. The method for reactivation of a catalyst according to claim 1 wherein said flowing of said heated carbon monoxide gas is initiated when said catalyst begins to lose said activity.

3. The method for reactivation of a catalyst according to claim 1 wherein said slag is an intermediate product of production of pig iron.

4. The method for reactivation of a catalyst according to claim 1 wherein said red mud is a product obtained from a process for production of aluminum.

5. The method for the reactivation of a catalyst according to claim 1 wherein said flowing said heated carbon monoxide over said catalyst continues for about four hours to about eight hours.

6. The method for reactivation of a catalyst according to claim 1 wherein said material comprises:
    Fe=60%, of which $Fe^{2+}=11.15\%$, Mn=0.21%, $SiO_2=6.60\%$, $Al_2O_3=2.17\%$, CaO=4.75%, MgO=1.44%, and P=0.08%.

7. The method for reactivation of a catalyst according to claim 1 wherein said slag comprises one of the members of the group consisting essentially of LDAG slag, Bessemer slag and LD slag;
    said LDAG slag having the following composition:
        Fe—23.60%
        $Fe^{2+}$—14.63%
        Mn—3.28%
        $P_2O_5$—5.78%
        CaO—40.10%
        and MgO
    said Bessemer slag having the following composition:
        Fe—14.02%
        $Fe^{2+}$—6.00%
        Mn—2.56%
        $P_2O_5$—15.42%
        CaO—48.85%
        MgO—1.14%
    said LD slag having the following composition:
        Fe—23.40%
        $Fe^{2+}$—9.03%
        Mn—3.60%
        $P_2O_5$—3.46%
        and CaO
        and MgO.

8. The method for reactivation of a catalyst according to claim 1 wherein said red mud comprises:
    $SiO_2$—11.10%
    $Al_2O_3$—33.50%
    $TiO_2$—14.40%
    $Fe_2O_3$—37.50%
    CaO—1.50%
    $ZrO_2$—0.46%.

9. The method for reactivation of a catalyst according to claim 1 wherein said catalyst includes at least 3% transition elements, said transition elements being in their lowest stable oxidation state.

10. The method for reactivation of a catalyst according to claim 9 wherein said transition elements are chosen from at least one member of the group consisting of Periodic Table Group IV B, Zirconium, Hafnium, Nickel, Cobalt and Manganese.

11. The method for reactivation of a catalyst according to claim 9 wherein said transition elements include iron, chromium and titanium.

12. The method for reactivation of a catalyst according to claim 11 wherein said transition element comprises $Fe^{2+}$, $Cr^{3+}$, and $Ti^{4+}$.

13. The method for reactivation of a catalyst according to claim 11 wherein said catalyst which is chosen from said member of the group consisting of said Sydvarange Iron Ore Concentrates, said mixture of Urkutsk Manganese Ore and Chromium Ore, and said mixture of Lake Iron Ore and Konrad Ore;

and wherein said Sydvarange Iron Ore Concentrate has the following composition:
Fe—65.51%
$Fe^{2+}$—21.50%
Mn—0.13%
P—0.01%
$SiO_2$—7.73%
$Al_2O_3$—0.55%
CaO—0.10%
MgO—0.68% and wherein said mixture of Urkutsk Manganese Ore and Chromium Ore has the following composition:
Fe—10.00% including a portion thereof as $Fe^{2+}$
$SiO_2$—5.00%
$Al_2O_3$—11.80%
CaO—0.58%
MgO—16.50%
$Cr_2O_3$—49.60% with Mn and P and further wherein said mixture of Lake Iron Ore and Konrad Ore has the following composition:
Fe—32.22%
$Fe^{2+}$—3.83%
Mn—0.24%
P—0.36%
$SiO_2$—14.52%
$Al_2O_3$—5.30%
CaO—12.52%
MgO—3.83%.

14. The method for reactivation of a catalyst according to claim 11, wherein said material comprises a mixture of Urkutsk Manganese Ore and Chromium Ore has the following composition:
Fe—10.00% including a portion thereof as $Fe^{2+}$
$SiO_2$—5.00%
$Al_2O_3$—11.80%
CaO—0.58%
MgO—16.50%
$Cr_2O_3$—49.60% with Mn and P.

15. The method for reactivation of a catalyst according to claim 11, wherein said material comprises a mixture of Lake Iron Ore and Konrad Ore has the following composition:
Fe—32.22%
$Fe^{2+}$—3.83%
Mn—0.24%
P—0.36%
$SiO_2$—14.52%
$Al_2O_3$—5.30%
CaO—12.52%
MgO—3.83%.

16. A method for reactivation of a catalyst which had been at least partially deactivated when used in removal of oxides of nitrogen from an exhaust gas, said catalyst comprising an iron-containing material used in a process of producing steel, said iron-containing material being chosen from a member of the group consisting essentially of magnetite, hematite, siderite, chromium ore, iron pyrite, sinter, iron ore pellets, slag, red mud, Sydvarange iron ore concentrate, manganese ore, Lake iron ore, Konrad ore and mixtures of the members of this group;

said method comprising the steps of:

switching said exhaust gas from a first chamber having said catalyst therein to a second chamber having a reactivated catalyst therein; and flowing heated carbon monoxide gas, which has been heated to a temperature of about 500° C., over said at least partially deactivated catalyst in said first chamber;

whereby at least a part of said carbon monoxide, in said first chamber, breaks down into carbon dioixde and carbon, thereby causing at least a part of the outermost inactive surface of said catalyst in said first chamber to break off to expose active catalyst surface;

turning off said flow of heated carbon monoxide to said first chamber after a predetermined length of time whereby at least a portion of said catalyst in said first chamber is reactivated;

holding said first chamber in preparation for introduction of said exhaust gas; then determining when said catalyst in said second chamber loses activity;

switching said exhaust gas from said second chamber having said catalyst therein to said first chamber;

flowing heated carbon monoxide gas which has been heated to a temperature of about 500° C. into said second chamber;

whereby at least a part of said carbon monoxide in said second chamber breaks down into carbon dioixde and carbon, thereby causing at least a part of the outermost inactive surface of said catalyst in said second chamber to break off to expose active catalyst surface;

turning off said flow of heated carbon monoxide to said second chamber after a predetermined length of time whereby at least a portion of said catalyst in said second chamber is reactivated;

holding said second chamber in preparation for introduction of said exhaust gas; and repeating the above steps.

* * * * *